Feb. 13, 1968 D. A. MASSA 3,369,074

TELEVISION TUBE SHIELD AND MOUNTING STRUCTURE

Filed April 2, 1965 2 Sheets-Sheet 1

Inventor:
Dominick A. Massa
By: Hofgren, Wegner, Allen, Stellman & McCord
Attorneys

TELEVISION TUBE SHIELD AND MOUNTING STRUCTURE

Filed April 2, 1965 2 Sheets-Sheet 2

United States Patent Office 3,369,074

Patented Feb. 13, 1968

3,369,074

TELEVISION TUBE SHIELD AND MOUNTING STRUCTURE

Dominick A. Massa, Arlington Heights, Ill., assignor to Warwick Electronics Inc., a corporation of Delaware Filed Apr. 2, 1965, Ser. No. 445,001

4 Claims. (Cl. 178—7.82)

ABSTRACT OF THE DISCLOSURE

A shielding structure for cathode ray tubes comprising a ring of circular cylindrical segmental elements and a ring of frusto-conical segmental elements tied together by tie members with a hook and slot connection at the juncture of the several segments.

This invention relates to television receivers and more particularly to a new and improved combination television tube protective shield and mounting structure.

There are various currents and stray voltages and the like present in a television chassis. These currents and voltages may set up magnetic fields in the vicinity of a television picture tube, which affect the purity of the picture. Efforts have been made to shield the picture tube from such magnetic fields, most often in the form of rather large and cumbersome metallic shields, spaced from the tube, thereby increasing cabinet size as well as being relatively inefficient for the purpose intended. Often these shields interfere with the means for mounting the picture. It is therefore a general object of this invention to provide a new and improved shield for a picture tube which protects the tube against stray magnetic fields present in a television receiver.

Another object of this invention is to provide a new and improved protective shield for a television picture tube which also serves as a means for mounting the tube to a television chassis.

Yet another object of this invention is to provide a new and improved protective shield for a television picture tube which closely hugs the periphery of the tube to firmly embrace the same so as to be capable of functioning as a mounting means for mounting the tube to a chassis or frame.

Other objects, features and advantages of the present invention will be apparent from the following description of the preferred embodiments illustrated in the accompanying drawings, in which.

Figures 1, 2, 3, 4:
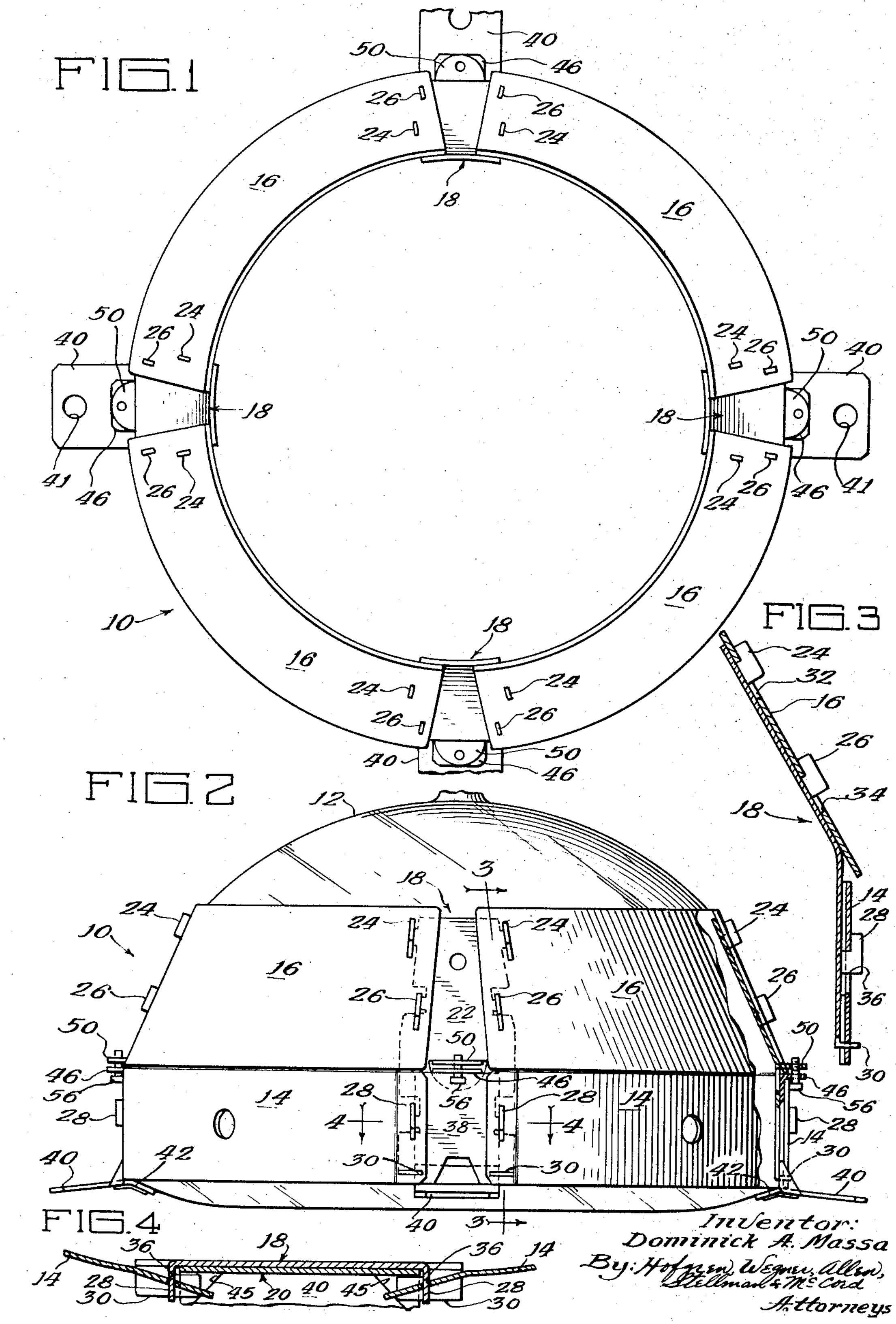
FIGURE 1 is an end elevational view of the protective mounting shield of this invention looking in toward the shield from a direction similar to looking downward from the top of FIGURE 2.
FIGURE 2 is a plan view partially broken away showing the mounting shield of this invention in use with a television tube.
FIGURE 3 is a section view taken along the line 3—3 of FIGURE 2.
FIGURE 4 is a section view taken along the line 4—4 of FIGURE 2.
Figures 5, 6, 7, 8, 9, 10:
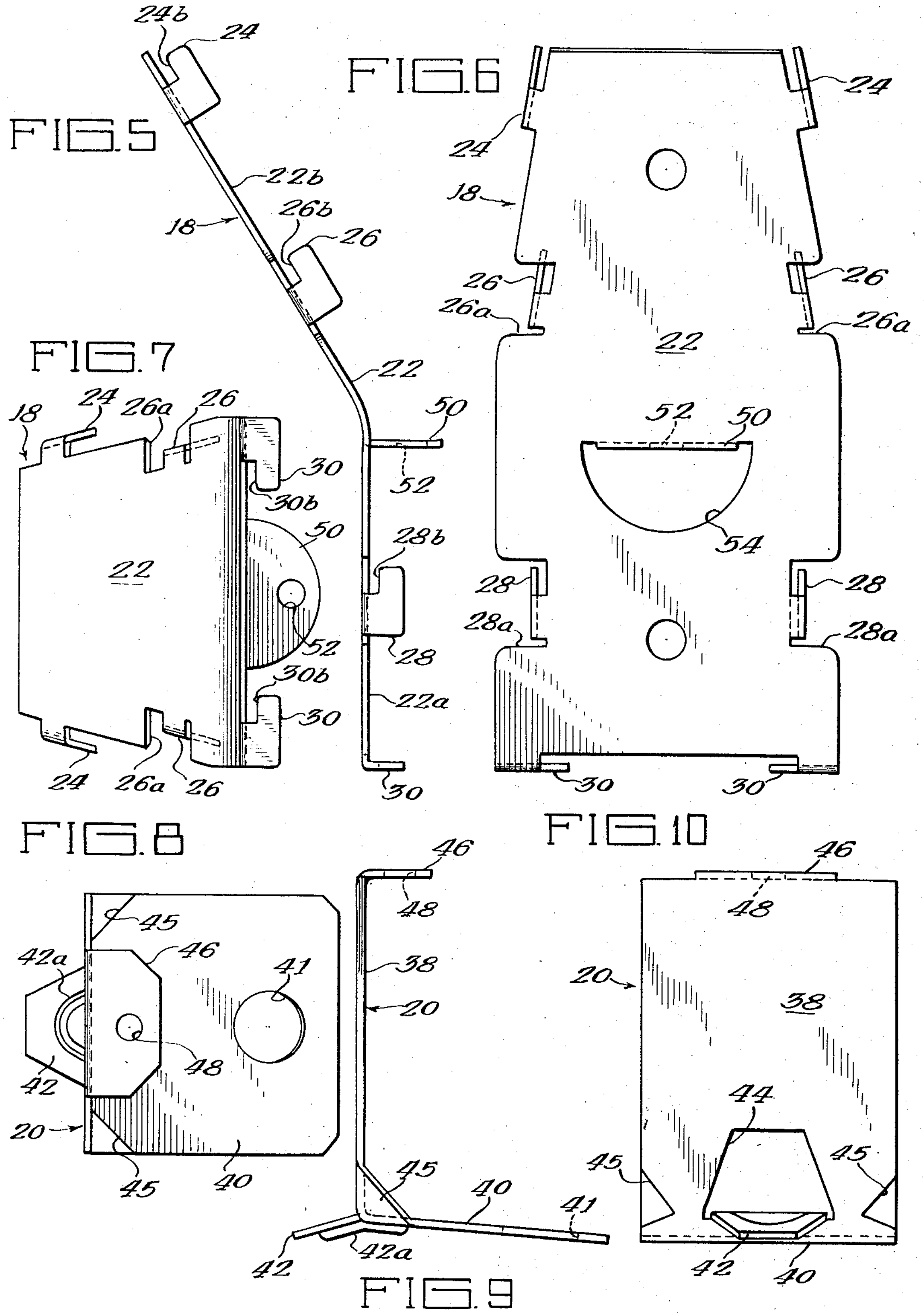
FIGURE 5 is a side elevational view of the tying member of this invention.
FIGURE 6 is a rear elevational view of the tying member shown in FIGURE 5.
FIGURE 7 is a bottom view of the tying member shown in FIGURE 5.
FIGURE 8 is a top plan view of the mounting bracket utilized with the mounting shield of this invention.
FIGURE 9 is a side elevational view of the mounting bracket shown in FIGURE 8.
FIGURE 10 is a rear elevational view of the mounting bracket shown in FIGURE 8.

The protective mounting shield 10 of this invention is intended for use with a television picture tube 12. The shield includes a plurality of first or circular segments 14 and second or conical segments 16, both preferably formed of thin sheet metal or the like. The circular segments 14 may be formed from substantially elongate rectangular strips of flat sheet metal and the conical segments may be formed from arcuate strips of flat sheet metal so that when the segments are bent, they form portions of the surface of a ring and a cone, respectively. A plurality of sheet metal tying members 18 are interposed between the circular and conical segments to secure the segments together as a circular ring and a frusto-conical ring and to also hold the two rings together. In the preferred embodiment, each segmental member 14 or 16 comprises approximately one-quarter of a complete circular ring and conical ring, respectively, and thus four such segments are used in each ring and four tie members are used to connect the segments together. A mounting bracket 20 may be secured to the tying member 18 to provide a means for mounting the tube embraced by the protective mounting shield into a cabinet frame or chassis.

The tying member 18 is a thin, elongate piece of sheet metal which is bent intermediate its ends to divide the member into a first or circular segmental member receiving portion **22*a* and a second or conical segmental member receiving portion 22*b*. Pairs of tabs are formed along both sides of the member 18 to provide a means for engaging the segmental members. For example, a first pair of conical segmental member tabs 24 are formed at the inner end of the tying member. Intermediate the ends of the member 18, but still within the portion 22*b*, a second pair of conical segmental member tabs 26 are struck out from the side of the body to leave a notch 26*a* in the body so that the tabs 26 are spaced inwardly relative to the tabs 24**.

On the portion **22*a* of the member, a pair of circular segmental member tabs 28 are struck out from the side of the body 22, leaving body notches 28*a*. At the outer end of the tying member 18, stop tabs 30 are provided which face inwardly toward the center of the member. The tabs 24, 26, 28 and 30 all project generally perpendicularly outwardly from the same face of the member 18. All tabs are provided with notched undercuts such as 24*b*, 26*b*, 28*b*, and 30*b***, respectively.

The circular segments 14 are provided with openings 36 of a size to receive the tabs 28 of the tying members. The segments 14 are secured to the tying members by impaling the tabs 28 through the openings 36 in segments 14 with the tabs 30 holding the segments 14 against movement beyond the outer end of the member. The tabs 28 may be easily bent with pliers or a simlar instrument to prevent withdrawal of the tabs 28 from the openings 36 and thereby secure the several segments 14 together as a tube embracing ring.

The conical segmental member 16 is also provided with openings 32 and 34 near each end of the segment of a size to receive the tabs 24 and 26 of the tying members. After the tabs 24 and 26 are impaled through the openings 32 and 34, the segmental members 16 may be moved relative to the tying member toward the outer end of the tie member so that the notched undercuts **24*b* and 26*b* of the tabs 24 and 26 may grip the segmental members 16 and hold the same against removal from the tying members. In this manner, the several conical segments 16 are secured together as a frusto-conical ring which slightly overlaps the ring of circular segments, and the ring of circular segments and the ring of conical segments are secured together as a shield 10 which closely hugs the periphery of the television tube to provide a most efficient magnetic shield protecting the tube against the "stray" voltages in the interior of the television set. The shield 10** holds the tube firmly enough to constitute a mounting structure which may be used to mount the picture tube to the television chassis or to the cabinet into which the picture tube is to be installed. Also, the relatively trim configuration of the shield does not interfere with compact chassis and cabinet designs.

For mounting the picture tube, the mounting bracket 20 is provided with an outwardly extending ear 40 having an opening 41 for receiving a fastening means for securing the picture tube to the appropriate surface of a television chassis or cabinet. The bracket 20 is further provided with a rearwardly extending lip 42, struck from the base portion 38 of the mounting bracket 20, leaving an opening 44 in the bracket. The lip 42 embraces a portion of the front face of the picture tube to stabilize the grip of the mounting bracket and the mounting shield relative to the picture tube. The lip 42 may be dimpled as shown in 42*a* to provide added strength.

Mounting bracket 20 also has inwardly directed, V-shaped grooves 45 formed near the bottom of either side of the base of the bracket. These grooves allow for the inward projection of the tabs 30 of the tying means 18 so that the tabs may be in a position to act as a stop means for the segments 14.

The top of the mounting bracket is provided with bent leg 46 having an opening 48. A leg 50 having an opening 52 is struck from the base of the tying member 18, leaving an opening 54. The mounting bracket may be secured to the tying means 18 by extending a fastener 56 through the openings 48 and 52 in the legs 46 and 50, respectively, of the tying means 18 and mounting bracket 20. As shown in FIGURES 1 and 2, when the mounting bracket is thus secured to the tying member, the ears 40 project outwardly from the periphery of the shield 10 substantially in the plane of the front face of the television tube. Suitable fasteners may be utilized through the openings 41 in the ears 40 to mount the picture tube to a chassis or cabinet.

This invention provides a very effective shield for a television tube which can also serve as a means for mounting the tube to a television chassis or cabinet. Also the shield is made of relatively simply formed components which may be rather easily and quickly assembled about the periphery of the tube. Thus, both the cost of the individual components themselves and the assembly thereof into a mounting shield are relatively low.

The foregoing detailed description has been given for clearness of understanding only, and no unnecessary limitations should be understood therefrom, as some modifications may be obvious to those skilled in the art.

I claim:

1. For use with a cathode ray tube, a protective mounting shield, comprising: a plurality of circular cylindrical segmental embracing members; a plurality of frusto-conical segmental embracing members; tie means for tying said segments into a circular cylindrical ring and a frusto-conical ring and for tying said cylindrical and frusto-conical rings together as a co-axial unit including a member interposed between the juncture of the circular cylindrical and frusto-conical segments and having a first portion for receiving said circular cylindrical segmental members and a second portion bent from said first portion for receiving said frusto-conical segmental members.

2. The tube shield of claim 1 wherein said tie member is provided with outwardly projecting tabs and said embracing members are provided with tab openings through which said tabs project to tie the segments into rings and to tie the rings together as a shield.

3. The tube shield of claim 2 wherein the tie member tabs are undercut and said tie member is provided with stop means at the end of the first portion, said first segmental embracing member abutting said stop means when impaled on the tabs of said tie means and said second segmental members hooked by said undercut portions of said tabs when impaled on said tie means.

4. The tube shield of claim 3 wherein mounting brackets are secured to the tie members to provide a means for mounting a tube embraced by said shield to a frame.

References Cited

UNITED STATES PATENTS

| | | | |
|---|---|---|---|
| 2,503,813 | 4/1950 | Fisch | 178—7.82 |
| 2,721,995 | 10/1955 | Friend | 178—7.82 |
| 2,797,408 | 6/1957 | Greatbatch | 178—7.82 |
| 2,860,328 | 11/1958 | Langworthy | 178—7.82 |

ROBERT L. GRIFFIN, *Primary Examiner.*

JOHN W. CALDWELL, *Examiner.*

J. A. ORSINO, *Assistant Examiner.*